United States Patent
Leon

(10) Patent No.: US 7,050,465 B2
(45) Date of Patent: May 23, 2006

(54) RESPONSE TIME MEASUREMENT FOR ADAPTIVE PLAYOUT ALGORITHMS

(75) Inventor: David Leon, Tampere (FI)

(73) Assignee: Nokia Corporation, Espoo (FI)

( * ) Notice: Subject to any disclaimer, the term of this patent is extended or adjusted under 35 U.S.C. 154(b) by 984 days.

(21) Appl. No.: 09/903,901

(22) Filed: Jul. 12, 2001

(65) Prior Publication Data

US 2002/0057686 A1    May 16, 2002

Related U.S. Application Data

(63) Continuation of application No. PCT/EP99/00179, filed on Jan. 14, 1999.

(51) Int. Cl.
*H04J 3/07* (2006.01)
*H04J 3/06* (2006.01)
*H04L 12/56* (2006.01)

(52) U.S. Cl. .................. 370/505; 370/516; 370/352

(58) Field of Classification Search ............ 370/252, 370/351–356, 503–510, 516–519
See application file for complete search history.

(56) References Cited

U.S. PATENT DOCUMENTS

| | | | | |
|---|---|---|---|---|
| 4,569,042 | A | | 2/1986 | Larson |
| 6,072,809 | A | * | 6/2000 | Agrawal et al. ............ 370/519 |
| 6,259,677 | B1 | * | 7/2001 | Jain ........................... 370/516 |
| 6,763,274 | B1 | * | 7/2004 | Gilbert ....................... 370/505 |

FOREIGN PATENT DOCUMENTS

WO    WO 97/22201    6/1997

OTHER PUBLICATIONS

Warren A. Montgomery; "Techniques for Packet Voice Synchronization", IEEE Journal of Selected Areas In Communications, vol. SAC-1, No. 6, Dec. 1983, pp. 1022-1028.
Sue B. Moon, Jim Kurose and Don Towsley; "Packet audio playout delay adjustment: performance bounds and algorithms", Multimedia Systems, Springer Verlag 1998, pp. 17-28.
Ramachandran Ramjee, Jim Kurose, Hennig Schulzrinne and Don Towsley; "Adaptive Playout Mechansims for Packetized Audio Applications in Wide-Area Networks", in Proceedings of the Conference on computer communications, (IEE Infocom, Toronto, Canada), IEE Computer Society Press, Los Alamitos, California, Jun. 1994, pp. 680-688.
International Search Report for PCT/EP99/00179.

* cited by examiner

*Primary Examiner*—Steven Nguyen
(74) *Attorney, Agent, or Firm*—Squire, Sanders & Dempsey L.L.P.

(57) ABSTRACT

The present invention discloses a system which comprises two endpoints (1, 2) communicating with each other by means of a packet-switched network. The endpoints (1, 2) use adaptation algorithms for estimating jitter from packet arrival times and for modifying silence period lengths according to the latest estimate. According to the present invention, the endpoints (1, 2) are able to measure a response time ($\rho$) at a certain point of time and use it as a parameter in the adaptation algorithms.

5 Claims, 2 Drawing Sheets

RESPONSE TIME MEASUREMENT FOR ADAPTIVE PLAYOUT ALGORITHMS

This application is a continuation of international application serial number PCT/EP99/00179, filed 14 Jan. 1999.

FIELD OF THE INVENTION

The present invention relates to packet-switched networks used for real-time multimedia communications, and in particular to a system and a method for measuring the response time for adaptive playout algorithms.

BACKGROUND OF THE INVENTION

Packet-switched networks are increasingly used for real-time multimedia communications. Thus, there is a requirement that endpoints be able to recover from network impairments.

One of these impairments is called "jitter". Jitter can be considered in a wide sense. Herein, jitter is the variation in the duration between the time a frame is captured by a transmitter audio card and the time it is received by a receiver. Therefore, it includes not only network jitter, i.e. variations in transmission delays, but also variations in processing delays.

Jitter is a severe audio stream impairment. In order to be understandable, audio streams must not be interrupted, or at least be interrupted as less as possible. If frames were played out as they arrive at the receiver, due to the jitter, the playing would be constantly interrupted. Hence, arriving frames are not played out immediately, but kept in a so-called jitter buffer. A playout algorithm must then be implemented in the receiver in order to determine the playout time of the received frames.

In its simplest form, the algorithm buffers the first received frame for a predetermined time before playing it. Therefore, instead of interrupting the audio stream, an initial delay is applied to the stream.

The problem with such a method, however, is to decide how long this buffer delay should be. A large delay will minimize the probability of an interruption but will cause a lack of interactivity between the end-users. Moreover, the packet delay distribution may be quite complex and variable over time. Thus, applying a fixed delay is satisfactory only in a limited number of cases, e.g. in communications over a Local Area Network (LAN) with limited delay, but does not scale to more complex networks, particularly the Internet.

In order to overcome the above-mentioned problem, adaptive algorithms have been introduced. Jitter adaptation is based on silence compression/expansion, wherein silence is a conversational device. In a conversation, silence indicates a speaker's expectation that his interlocutor starts talking. Therefore, silence can be expanded or compressed without impairing the understandability. An adaptation algorithm estimates the jitter from packet arrival times and then modifies silence period lengths according to the latest estimate. For example, jitter adaptation algorithms based on this idea can be found in Sue B. Moon, Jim Kurose, Don Towsley, "Packet audio playout delay adjustment: performance bounds and algorithms", Multimedia Systems, Springer Verlag 1998, pp. 17–28, and in Ramachandran Ramjee, Jim Kurose, Don Towsley, Henning Schulzrinne, "Adaptive Playout Mechanism for Packetized Audio Applications in Wide-Area Networks", in Proceedings of the conference on computer communications, (IEE Infocom, Toronto, Canada), pp. 680–688, IEE Computer Society Press, Los Alamitos, Calif., June 1994.

In the above-mentioned adaptive or adaptation algorithms, the received frames playout times are computed so as to achieve a good trade-off between buffering delay and residual drop rate, which will be described later.

However, this adaptation scheme is not sufficient because it trades-off a drop percentage against an added buffering delay. What should be traded-off is the drop against the response time which is defined as the time elapsed between the capture of a given frame of speech at one endpoint and its playout at an other endpoint plus the same quantity in the other direction. In accordance with the conventional adaptation scheme mentioned above, the added delay reflects only partially the response time.

It is therefore an object of the present invention to overcome the aforementioned adaptation algorithm limitations and to allow a terminal to trade-off the response time against the drop instead of the added buffering delay against the drop.

SUMMARY OF THE INVENTION

According to a first aspect of the present invention, this object is achieved by a system which comprises two endpoints communicating with each other by means of a packet-switched network. The endpoints use adaptation algorithms for estimating jitter from packet arrival times and for modifying silence period lengths according to the latest estimate. According to the present invention, the endpoints are able to measure a response time $\rho$ at a certain point of time and use it as a parameter in the adaptation algorithms.

According to a second aspect of the present invention, this object is achieved by a method for measuring a response time $\rho$ between two endpoints in a packet-switched network system, which comprises the steps of sending a response time request packet from a first endpoint to a second endpoint at a time $s_r$, receiving the response time request packet at the second endpoint at a time $r_r$, sending a response time indication packet from the second endpoint to the first endpoint at a time $s_i$, receiving the response time indication packet at the first endpoint at a time $r_i$, and computing the response time $\rho$ on the basis of the sending and receiving times in the first endpoint.

According to the present invention, a significant improvement in complex networks, in particular in Internet telephony quality, can be achieved.

Further developments of the present invention are defined in the respective appended subclaims.

In the following, a preferred embodiment of the present invention is described by taking into account the accompanying drawings.

DETAILED DESCRIPTION OF THE PREFERRED EMBODIMENT

Figure 1:
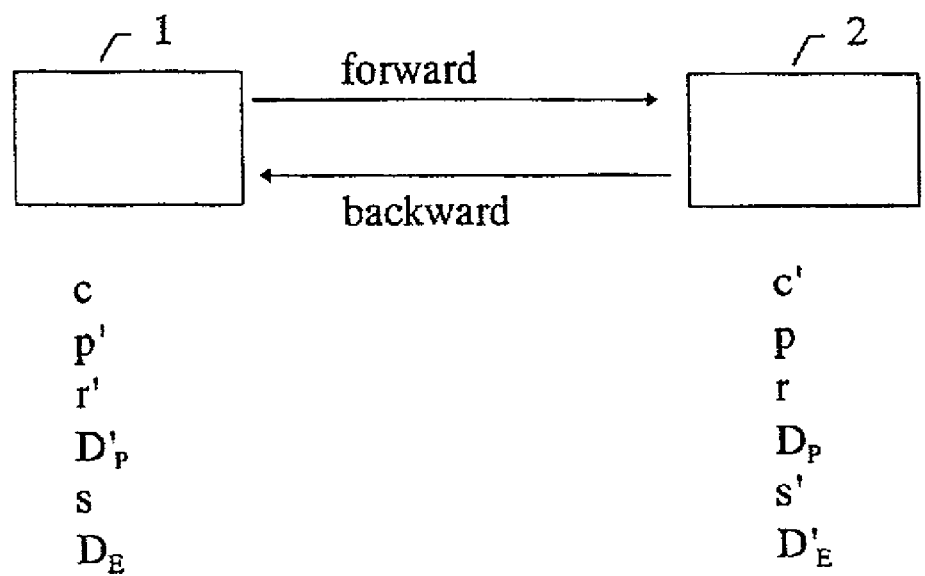
FIG. 1 shows two endpoints communicating with each other.

The present invention is to be used in conjunction with adaptive or adaptation algorithms. It can be applied to any jitter adaptation algorithm based on silence compression/ extension. At first, in order that the present invention be more readily understood, a short description of these adaptation algorithms is given below.

In formalizing the algorithms, c is the capture time of a given frame for a transmitter and p is the playout time scheduled by a receiver for this frame. If T is the transmission time of the considered frame, the following property P1 is obtained:

if p>c+T, the frame is received before scheduled for playout and can thus effectively be played out; and if p<c+T, the frame is dropped because it is not available in time.

When silence compression is used, a speech bit-stream is composed of active speech frames followed by silence frames. The received streams are conceptually fragmented in bursts wherein a burst starts at the first frame of an active speech period and ends at the last frame of the following silence period. Thus, the burst contains not only the talkspurt (active speech), but also the silence period until the next talkspurt.

All the (speech) frames belonging to the same burst are scheduled at an audio frame interval in order to avoid interruption during active speech, because such an interruption is very annoying for users. Thus, the playout time $p_{i,j}$ for the $i^{th}$ frame of the $j^{th}$ burst can be written as:

$$p_{i,j}=p_{1,j}+(i-1)\delta,$$

wherein $\delta$ is the audio frame interval.

For the very first received frame (i.e. of the first burst) an initial $p_{1,1}$ is chosen (algorithm dependent).

When the next burst is received (j+1), the receiver may choose:

either to keep the synchronization with the previous burst and in that case: $p_{1,j+1}=p_{I,j}+\delta$, with I being the last frame of burst j, or to adapt and use a new value $p_{1,j+1}$.

In the following it will be described how silence frame suppression and addition are used to adjust to the playout discontinuities resulting from adaptation.

If the first frame of the burst j+1 is scheduled after the last frame of burst j, i.e. $p_{1,j+1}>p_{I,j}$, then the receiver plays out silence frames between the two playout times. It is to be noted that, since silence may be added only as a multiple number of frames, $p_{1,j+1}$ cannot be set to the value as computed but only to a closest possible value.

Similarly, if the first frame of the burst j+1 is scheduled before the last frame of burst j, i.e. $p_{1,j+1}<p_{I,j}$, this should reflect that the playout times have been previously overestimated. In that case, there should be some silence frames available in the playout buffer waiting for being played out. Some of those frames are discarded so that the playout be as close as possible to the computed value.

From the above-given analysis, the adaptation algorithms exhibit the following property P2:

For certain adaptation points (usually the talkspurt start), the playout can be expressed as p=r+B, with r being a frame reception time and B a buffer delay chosen by the respective algorithm. For other packets (frames), the playout is synchronized with the previous packet playout, i.e. it is obtained by adding an integral number of audio frame durations (audio frame intervals).

It is to be noted that, referring to property P1, the higher the value of B, the less the drop rate. The algorithms differ only in the choice of B and the decision of when to adapt.

The present invention can be applied to any algorithm verifying the property P2.

The above-described jitter adaptation algorithms compute the received frames playout times in order to achieve a good trade-off between buffering delay and residual drop rate.

However, as already mentioned, the adaptation scheme used by the jitter adaptation algorithms is not sufficient, because it trades-off the drop percentage against the added buffering delay, as described in the foregoing. What should be traded-off is the drop against the response time. The added delay reflects only partially the response time. According to the present invention, a receiver is allowed to know the response time at a certain point of time and to use it as a parameter in its adaptation algorithm, which will be described in the following.

In FIG. 1, two endpoints 1 and 2, i.e. two end-terminals, are shown communicating with each other. Devices between the two end-users at the two endpoints 1 and 2, respectively, i.e. the endpoints 1 and 2 and a network (not shown), form a system according to the preferred embodiment of the present invention. The response time of the system at a given time instant is defined as the time elapsed between the capture of a given frame of speech at one endpoint and its playout at the other endpoint plus the same quantity in the other direction.

As an illustration, it is supposed that one person (one end-user) asks another a question such as "how much is 2+2?". If the two persons were talking face to face it would take a time T for the person to think of the result. If the two persons are now communicating through the system, it will now take a time T+ρ to get the answer, with ρ being the response time as defined above.

To be precise, the value that matters to the end-users is therefore the response time as defined above and not the added buffer delay. As a consequence, it is this value which has to be traded off against the drop rate.

It can be demonstrated that, if two endpoints use a playout algorithm which exhibits the property P2, the following property P3 also holds:

As long as no adaptation is done on either side (i.e. packet playout synchronized with that of the previous packet), the value of the response time remains constant.

Whenever one of the endpoints performs adaptation, this terminal can compute the increase or decrease of the response time due to the adaptation.

With respect to FIG. 1, c is the capture time and p is the scheduled playout time of a frame sent from the endpoint 1 to the endpoint 2 in what is arbitrarily called the forward direction. Similarly, c' and p' are the same quantities in the reverse direction, i.e. c' is the capture time and p' is the scheduled playout time of a frame sent from the endpoint 2 to the endpoint 1 in the backward direction.

The response time as defined above is given as $$\rho=(p-c)+(p'-c')$$

In order to demonstrate the property P3 the response time is calculated for two consecutive pairs of packets (frames) n and n+1:

$$\rho_n=(p_n-c_n)+(p'_n-c'_n)$$

$$\rho_{n+1}=(p_{n+1}-c_{n+1})+(p'_{n+1}-c'_{n+1})$$

If no adaptation is performed:

$p_{n+1}=p_n+\delta$ and $c_{n+1}=c_n+\delta$. Thus $p_{n+1}-c_{n+1}=p_n-c_n$, and similarly $p'_{n+1}-c'_{n+1}=p'_n-c'_n.$ Therefore, if no adaptation is performed:

$$\rho_{n+1} = \rho_n.$$

It is now supposed that one of the endpoints chooses to adapt, for instance, the receiver on the forward path. In that case, $p_{n+1} \neq p_n + \delta$.

The resulting variation in response time is then:

$$\Delta\rho_{n+1} = \rho_{n+1} - \rho_n = p_{n+1} - p_n - \delta.$$

This quantity can be calculated by the endpoint performing the adaptation.

The important consequences of property P3 are:

- As long as no adaptation is performed, changes in the network conditions do not produce any change on the response time value. For instance, a sudden increase in transmission times does not incur any increase in the response time. However, fewer frames may arrive before their scheduled playout time and thus the drop rate may be increased.
- Since endpoints know the response time variation caused by adaptation, if they could measure the response time before making adaptation, they could trade-off the response time against the drop rate.

For example, at a certain point, the receiver adaptation algorithm estimates that delaying the playout delay by a further 200 ms would considerably decrease the loss or drop rate. If it knew that the response time at that time instant is 50 ms, then it could derive that the resulting response time will be 250 ms if it performs adaptation. It may then consider this value small enough and actually perform the adaptation. On the other hand, if the response time is 800 ms before adaptation, it may consider that the resulting 1000 ms response time is too large and thus not adapt or adapt with a lower delay.

The present invention provides a system and a method for measuring the response time when the end-terminals use adaptation algorithms verifying the property P2, and therefore allows the terminal or endpoint to trade-off the response time against the drop instead of the added buffering delay against the drop.

Figure 2:
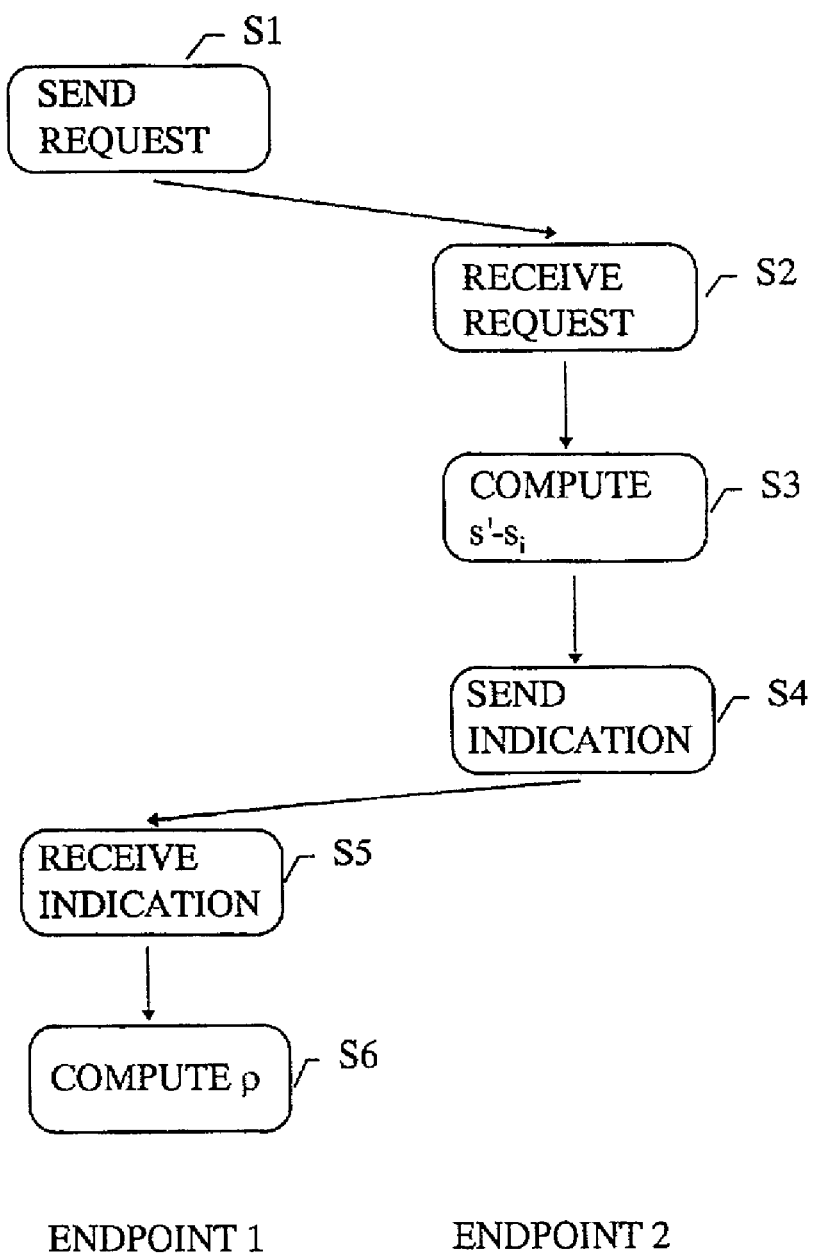
FIG. 2 shows a flowchart of the procedure for measuring the response time according to the preferred embodiment of the present invention.

In the following, the measurement procedure according to the preferred embodiment of the present invention is described with reference to FIGS. 1 and 2.

On the basis of property P3, any pair of frames (one in each direction) can be used to calculate the response time at a certain time instant, since the last adaptations were made on each side. For the sake of simplicity, the frames are used for which the last adaptation was made in the forward and reverse directions.

The playout times p and p' at the endpoint 2 and the endpoint 1, respectively, for those frames are given as:

$$p = r + D_P \text{ and}$$

$$p' = r' + D'_P,$$

with r and r' being the frame reception times of the endpoints 2 and 1, respectively, and $D_P$ and $D'_P$ being the respective adaptation playout delays.

It is assumed that s and s' are the times the corresponding frames were sent in the forward and reverse (backward) directions, respectively:

$$s = c + D_E \text{ and}$$

$$s' = c' + D'_E,$$

with c and c' being the respective capture times and $D_E$ and $D'_E$ being the respective encoding delays (the encodings need not to be the same).

The response time $\rho = (p-c) + (p'-c')$ can thus be expressed as:

$$\rho = (r-s) + (r'-s') + (D_E + D_P + D'_E + D'_P), \text{ or}$$

$$\rho = T + T' + (D_E + D_P + D'_E + D'_P),$$

with T and T' being the respective frame transmission delays.

It is supposed that the terminal which sends packets along the forward path (the endpoint 1) wants to determine the response time. To that end, it sends a response time request packet (as a UDP packet in case RTP is used) to a port at the other endpoint 2 (S1 in FIG. 2) which was negotiated prior to the transmission of the associated stream. Information carried in the request packet will be described later on.

Upon receipt of the request packet (S2 in FIG. 2), the endpoint 2 transmits immediately a response time indication packet to a port at the endpoint 1 (S4 in FIG. 2) which was also negotiated in advance. Information carried in the indication packet will be described later on.

The request is sent at a time $s_r$ from the endpoint 1 and is received at a time $r_r$ by the endpoint 2. The indication is sent at a time $s_1 = r_r$ (or at least very close to) from the endpoint 2 and is received at a time $r_i$ by the endpoint 1 (S5 in FIG. 2).

The associated transmission times are:

$$T_r = r_r - s_r, \text{ and}$$

$$T_i = r_i - s_i.$$

The round-trip delay which can be measured by the endpoint 1 making the request is given as:

$$T_r + T_i = r_i - s_r.$$

In expressing the sum of the frame transmission delays T+T' by:

$$T + T' = (T - T_r) + (T' - T_i) + (T_r + T_i)$$
$$= (r - r_r) + (s - s_r) + (r' - r_i) + (s' - s_i) + (T_r + T_i),$$

the response time is given as:

$$\rho = (r - r_r) + (s - s_r) - (r' - r_i) + (s' - s_i) + (T_r + T_i) + D_E + D_P + D_E + D_P.$$

The idea to compute the response time is to see that some of the terms can be calculated by the endpoint 1 making the request and the remaining terms can be calculated by the endpoint 2 answering the request. The latter can therefore send the sum of the terms it knows in the indication packet.

The endpoint 1 (terminal making the request) knows:

$D_E$ $D'_P$ $T_r + T_i$ $r' - r_1$, since they are both measurable with the same clock.

s and $s_r$ are also measurable using the request sender clock (the clock of the endpoint 1), but s is the sending time for which the receiver (the endpoint 2) performed adaptation. The sender, i.e. the endpoint 1, does not know a prior for which frame the receiver performed the latest adaptation. However, if the receiver indicates in the response time indication packet some information identifying that frame (for example its RTP timestamp in case RTP is used), the sender can lookup the corresponding sending time and make the computation $s-s_r$. This, however, does not mean that the sender must keep in memory all the sending times of the packets it sends, since packets are sent at regular intervals. In case RTP is used, the sender can infer the difference in frame sending times from the frame RTP timestamps.

The endpoint 2 (terminal answering the request) knows:

$D'_E$ $D_P$ $r-r_r$

In addition, if the endpoint 1 making the request sends in the request packet some information identifying the latest frame for which it performed adaptation, the endpoint 2 can also calculate $s'-s_1$ (S3 in FIG. 2) and can indicate this information in its indication packet.

Therefore, in step S6, the response time can be computed in the endpoint 1.

It is to be noted that the response time value remains valid as long as none of the endpoints performs adaptation. If the requested endpoint chooses to adapt between the time it sends the response time indication and the time the other endpoint receives it, then the computed response time might be an outdated value. However, if the two endpoints agree on a maximum adaptation step per unit of time, nevertheless an upper bound on the response time can be derived.

A further point to be mentioned is that response time request or indication packets might get lost. However, if requests are made often enough, the response time value will be updated at the next opportunity.

In the following, an example of an application of the present invention is described.

It is supposed that an audio codec is used for which it is considered that 20% is the maximum acceptable drop rate. It is also supposed that experiments have been made to assess the trade-off between drop and response time. For example, it has been determined that a one-second response time and a 5% drop is better than a two-second response time which would lower the drop to 2%.

The endpoints have agreed that they are not allowed to increase the response time by more than 100 ms every 10 seconds, and send a response time request every 5 seconds.

To the first frame they receive, the endpoints apply an initial buffer delay of for example 50 ms, and for the following talkspurts the following holds:

If the drop rate is more than 20%, the buffer delay is increased to get 20%, no matter what value the measured response time has.

If the drop rate is less than 20%, the measured response time is traded-off (using an upper bound on the last measurement) against the residual drop rate.

According to the present invention, endpoints using any adaptation algorithm satisfying the property P2 are able to measure the response time. In particular, the two endpoints need not use the same algorithm.

It is noted that an implementation of the present invention requires the definition of a complete protocol which specifies the format of the response time request and indication packet (particularly the time format). The present invention is in no way limited to a particular protocol or implementation.

Thus, the present invention produces a significant improvement, for example, in Internet telephony quality.

While the invention has been described with reference to a preferred embodiment and an application example, the description is illustrative of the invention and is not to be construed as limiting the invention. Various modifications and applications may occur to those skilled in the art without departing from the true spirit and scope of the invention as defined by the appended claims.

The invention claimed is:

1. A system comprising two endpoints (1, 2) communicating with each other by means of a packet-switched network, said endpoints (1, 2) being adapted to estimate jitter from packet arrival times and to modify silence period lengths according to the latest estimate by using adaptation algorithms, wherein a response time ($\rho$) of the system is measured at a given time instant, the response time being defined as the time elapsed between the capture of a given frame of speech at one endpoint and its playout at the other endpoint plus the same quantity in the other direction, wherein:

a first endpoint (1) is configured to send a response time request packet to a second endpoint (2) at a time $s_r$;

said second endpoint (2) is configured to receive the response time request packet at a time $r_r$;

said second endpoint (2) is configured to send a response time indication packet to said first endpoint (1) at a time $s_i$;

said first endpoint (1) is configured to receive the response time indication packet at a time $r_i$; and said first endpoint (1) is configured to compute the response time ($\rho$) on the basis of the sending and receiving times, wherein the response time is used as a parameter in the adaptation algorithms, wherein the response time request packet sent from said first endpoint (1) includes information identifying one of the rackets which has been sent at a time s' by said second endpoint (2) and received at a time r' by said first endpoint (1) since its latest adaptation, and wherein the response time indication packet sent by said second endpoint (2) includes information identifying one of the packets which has been sent at a time s' by said first endpoint (1) and received at a time r by said second endpoint (2) since its latest adaptation, and wherein said second endpoint (2) is configured to compute s'−s, and indicate the result in the response time indication packet.

2. The system according to claim 1, wherein said endpoints are adapted to verify that for certain adaptation points the playout ($\rho$) of a packet can be expressed as p=r+B, where r is a packet reception time and B is a buffer delay chosen by using the algorithms, and to synchronize the playout for other packets with the previous packet playout.

3. The system according to claim 1, wherein said endpoints (1, 2) are adapted to use different ones of said adaptation algorithms.

4. A method of using adaptation algorithms for estimating jitter from packet arrival times and for modifying silence period lengths according to the latest estimate, in communications between two endpoints in a packet-switched network system, said method having the steps of:

measuring a response time ($\rho$) of the system at a given time instant, the response time being defined as the time elapsed between the capture of a given frame of speech at one endpoint and its playout at the other endpoint plus the same quantity in the other direction, the measuring comprising the steps of sending (S1) a response time request packet from a first endpoint (1) to a second endpoint (2) at a time $s_r$;

receiving (S2) the response time request packet at said second endpoint (2) at a time $r_r$;

sending (S4) a response time indication packet from said second endpoint (2) to said first endpoint (1) at a time $s_i$;

receiving (S5) the response time indication packet at said first endpoint (1) receiving at a time $r_i$; and computing (S6) the response time ($\rho$) on the basis of the sending and receiving times in said first endpoint (1); and using the response time as a parameter in the adaptation algorithms, wherein the response time request packet sent from said first endpoint (1) includes information identifying one of the packets which has been sent at a time s' by said second endpoint (2) and received at a time r' by said first endpoint (1) since its latest adaptation, and wherein the response time indication packet sent from said second endpoint (2) includes information identifying one of the rackets which has been sent at a time s by said first endpoint (1) and received at a time r by said second endpoint (2) since its latest adaptation, and wherein $s'-s_i$ is computed in said second endpoint (2) (S3) and the result is indicated in the response time indication packet.

5. The method according to claim 4, wherein in said calculating step the response time ($\rho$) is calculated according to the following expression:

$$\rho=(r-r_r)+(s-s_r)-(r'-r_i)+(s'-s_i)+(T_r+T_i)+D_E+D_P+D'_E+D'_P$$

wherein $D_E$ and $D+_E$ are encoding delays of the first and second endpoints, respectively, $D'_p$ and $D_p$ are adaptation playout delays of the first and second endpoints, respectively, and $T_r=r_r-s_r$ and $T_i=r-s_i$, and wherein the quantities of $D_E$, $D'_p$, $T_r+T_i$, $r'-r_1$ and $s-s_r$ are known or can be computed in said first endpoint (1) and the quantities of $D'_E$, $D_p$, $r-r_r$ and $s'-s_i$ are indicated in the response time indication packet.

* * * * *